US006588827B2

(12) United States Patent  
Heiland (10) Patent No.: US 6,588,827 B2
(45) Date of Patent: Jul. 8, 2003

(54) PROTECTIVE COVER FOR MOTOR VEHICLES

(75) Inventor: Rolf Heiland, Magstadt (DE)

(73) Assignee: Heinrich Heiland GmbH (DE)

( * ) Notice: Subject to any disclaimer, the term of this patent is extended or adjusted under 35 U.S.C. 154(b) by 0 days.

(21) Appl. No.: 10/074,423

(22) Filed: Feb. 12, 2002

(65) Prior Publication Data

US 2002/0113458 A1 Aug. 22, 2002

(30) Foreign Application Priority Data

Feb. 13, 2001 (DE) .................................... 201 02 625 U
Apr. 9, 2001 (DE) .................................... 201 06 196 U
Jun. 29, 2001 (DE) .................................... 201 10 609 U (51) Int. Cl.⁷ ............................................. B62D 25/06
(52) U.S. Cl. ....................... 296/136; 296/95.1; 150/166
(58) Field of Search ............................... 296/95.1, 136; 150/166

(56) References Cited

U.S. PATENT DOCUMENTS

| 4,635,996 A | * | 1/1987 | Hirose ........................ 296/136 |
| 4,938,522 A | * | 7/1990 | Herron et al. ............... 150/166 |
| 5,343,915 A | * | 9/1994 | Newsome ................... 150/166 |
| 5,605,369 A | * | 2/1997 | Ruiz ........................... 150/166 |
| 5,794,361 A | * | 8/1998 | Sadler ............................ 36/29 |
| 5,845,958 A | * | 12/1998 | Rudys et al. ............... 150/166 |
| 5,915,399 A | * | 6/1999 | Yang ........................ 296/136 |
| 6,099,067 A | * | 8/2000 | Butterworth ................ 296/136 |
| 6,273,493 B1 | * | 8/2001 | Woo ............................ 150/166 |
| 6,371,547 B1 | * | 4/2002 | Halbrook .................... 150/166 |
| 2001/0045758 A1 | * | 11/2001 | Vieira-Soares ............. 296/136 |
| 2002/0007888 A1 | * | 1/2002 | Gregorek ................... 150/166 |

* cited by examiner

Primary Examiner—Stephen T. Gordon
Assistant Examiner—Lori L Coletta
(74) Attorney, Agent, or Firm—McGlew & Tuttle, P.C.

(57) ABSTRACT

A protective cover (1) for motor vehicles, machines or the like for the preventive protection of the surface against abrasive or chemical emissions, moisture caused by condensation and waterlogging and penetrating moisture as well as against mechanical damage during parking, storage and transportation. The protective cover that optimally protects the entire surface, is adaptable to different and complicated surface shapes as well as to projecting and movable as well as accessible parts, can be handled easily and in a site-independent manner, can be used repeatedly, and guarantees the movement and the control of the object being protected as well as the temporary use of movable parts or of parts that are to be opened without damaging the protective cover. Different variants of partial covers (5) for surfaces needed for visibility and of partial covers (4) for doors, which said partial covers can be repeatedly opened and closed, by the stable anchoring of the protective cover at the underbody with cutting rails (16) and hooks (17), moldings (14) to be snapped in at the wheelhouses, a fastening flap (13) that can be hung in repeatedly at the edge of the hood, clamping profiles (12) in the door rabbets, clamping profiles (15) at the roof rail, etc.

12 Claims, 5 Drawing Sheets

PROTECTIVE COVER FOR MOTOR VEHICLES

FIELD OF THE INVENTION

The invention relates to protective cover for motor vehicles, machines or the like, especially for the preventive protection of both the surface against abrasive or chemical emissions, e.g., dust, rust film, bird droppings, moisture caused by condensation and waterlogging as well as against mechanical damage, e.g., damage caused by scratching and grinding and damage resulting therefrom during parking, storage and transportation.

BACKGROUND OF THE INVENTION

Besides the protection against mechanical damage by means of protective strips, e.g., those made of Styropor, a protective measure that provides for the application of a wax layer to the surface of the object against damage to the surface during transport and longer parking times of motor vehicles, machines and other objects to be protected has become known. This protective measure has the drawback that after delivery, the objects to be protected must be dewaxed. This is usually carried out by means of chemical auxiliary agents, as a result of which waste water polluted with chemicals is generated, which must be disposed of as special waste.

Another protective measure provides for the application of adhesive films by means of a doctor blade. This protective measure is time-consuming because no air bubbles must be formed between the paint and the film during the application, because they may later become permanently visible on the paint. In addition, films thus applied are allowed to remain on the object being protected over a limited period of time only. Another drawback of this measure is that only relatively flat surface areas can be protected with these films due to their limited degree of stretching.

Protective covers from plastics or plastic-coated textile tarpaulins have also been known, in which motor vehicles, machines or other objects to be protected can be wrapped, the tarpaulin cover being fastened by the additional application of adhesive strips or clamped with strings or cords. These tarpaulins are characterized in that a speed-dependent vacuum is generated during the transportation due to the oncoming air flow, and the cover material located over the outer skin of the object being protected in drawn on by this vacuum. This in turn leads to ballooning or to fluttering of the cover material and consequently to mechanical stress especially on the surface of the object being protected and to damage to this surface.

A three-layer plastic film has also been known from a prospectus of the firm of Transhield Europe AS, 0151 Oslo, in which a protective cover previously sewn to the fitting shape is shrunk onto the outer skin of a vehicle. In areas of the vehicles that must be accessible, the shrunk film is either cut up and the cut edges are fixed with adhesive tape, or a zipper is incorporated. Based on the shrinkage properties of the material, the three-layer plastic film cannot be welded but only sewn, which in turn leads to problems in terms of sealing in the sewn areas. The three-layer plastic film is characterized by an outer ethylenic copolymeric vinyl acetate film, a middle copolymeric thermoplastic, and an inner, polyester-knit material, which possesses, among other things, waterproof and water-absorbent properties. The three-layer plastic film lying snugly, e.g., on the outer skin of a vehicle thus forms a nearly impermeable barrier layer between the surface of the vehicle and the environment. Even though the waterproofness of the material prevents moisture from penetrating from the outside to the surface of the vehicle, it provokes the formation of condensate between the surface of the vehicle and the plastic film under the action of heat, e.g., due to sunshine. In addition, the absorbing action of the inner polyester-knit material is limited. For example, even though water penetrating into the area under the protective cover from the environment through the seams or moisture formed by condensation is absorbed, it is again released after a certain degree of saturation is reached. This circumstance is especially problematic during longer-term transportation and storage because the saturated polyester-knit material will again release the moisture absorbed between the surface of the packaged product and the protective cover, as a result of which waterlogging is generated with the disadvantageous effects on the paint surface or seals. Water and the protective covers may freeze on at below-zero temperatures and mildew may grow between the surface of the vehicle and the protective cover in regions with a hot and humid climate. Finally, the shrinking on of the three-layer plastic film is labor-intensive and is bound to a given site.

U.S. Pat. No. 5,845,958 discloses an automobile transport protective cover, which comprises a plurality of parts that are detachably anchored to parts of the vehicle by elastic rubber bands independently from one another, wherein doors and windshields and windows are not covered. In another variant, the protective cover is made in one piece, which has trimmed areas, which are bonded at their edges to the surface of the vehicle, at the windshield and rear window, at the side windows as well as at the headlights and tail lights; in addition, a trimmed area is provided at the driver's side door, which area can be opened and again closed with hook and loop fastener as needed. Various materials are provided for the protective cover, and these materials are impermeable to water vapor and repel moisture, on the one hand, and they repel heat in a second preferred variant.

Parts of the vehicle remain unprotected in all embodiments of this protective cover, and they are exposed to harmful environmental effects as well as to mechanical damage. Furthermore, the protective cover comprising a plurality of parts permits the relative wind to penetrate into the parts of the cover and it causes the material to inflate and to strike the surface of the vehicle during transport, which in turn leads to damage to the surface. The cover material lacks sufficient transparency to light and has only certain properties, which do not occur combined in any variant of materials, as a result of which there is condensation between the vehicle and the protective cover and consequently a risk for corrosion or a risk for the cover to freeze on the surface of the vehicle. The material is permeable to dust, as a result of which very fine dust particles can penetrate under the parts of the cover and cause mechanical damage on the paint. Finally, the exposed windshield and rear window are exposed unhindered to chemical air pollutants.

Furthermore, DE 199 04 140 A1 discloses a flexible packaging following the shape of the body for a motor vehicle, which is made as a protective cover adapted to the shape of the motor vehicle to be packaged and made of an elastic web material, which extends over the entire vehicle up to the lower edge and can be clamped on the body by means of tensioning bands acting at its edges. The protective cover is adapted to the shape and size of the body of the motor vehicle to be wrapped by permanently fitting together, especially sewing together certain shaped parts of a stretchable web material, which has trimmed areas in the area of the windshield and windows, air inlet openings and wheel housings. The trimmed areas at the windows either remain free, the edges are fastened to the motor vehicle with adhesive tapes, or the trimmed areas can be replaced with transparent material, which is bonded at its edges to the cover. The elastic web material is a single-layer material or it comprises, in a second variant, at least two individual layers permanently connected to one another, wherein the layer facing the surface of the vehicle consists of a tricot-like carrier material of high elasticity, and the layer directed toward the environment consists of a laminated plastic film, whose inherent rigidity is lower than that of the carrier material. Due to the laminated plastic film, this material is not permeable to air from the inside, as a result of which condensate can be formed under the cover. The high elasticity of the material also proves to be disadvantageous, because it may lead to scouring phenomena on the paint of the vehicle when even very fine dust particles accumulate under the cover.

SUMMARY OF THE INVENTION

The object of the present invention was to improve the underlying protective cover of this type to the extent that it will optimally protect the object to be protected over its entire surface, can be adapted to different and complicated surface shapes as well as to projecting and movable as well as accessible parts, can be easily handled anywhere, can be used repeatedly, and guarantees the movement and controlling of the object being protected as well as the temporary use of movable parts or of parts that can be opened during the transport without being damaged.

The protective cover according to the present invention, which consists of a material at is permeable to air, water vapor and light from the inside and is resistant to UV rays and alkalies and is impermeable to water and dust from the outside and can be printed on, has the advantage that the parts of the protective cover consisting of one piece can be easily adapted to the particular model of vehicle and can be connected to one another by sewing or welding in a non-positive manner. Trimmed areas, e.g., for surfaces needed for visibility, such as windshields or rear windows, doors, hoods and wheelhouses, can be arranged in an accurately fitting manner according to the model of the vehicle and as needed and can be fastened and sealed at the edges of the trimmed areas of the protective cover, on the one hand, and on the object to be protected or at the edges of partial covers for areas needed for visibility, doors, control locations or filler inlet compartment lids, on the other hand, by means of repeatedly closable and detachable closures, such as hook and loop fastener, a two-sided adhesive tape and zippers.

The various possibilities of protection for surfaces needed for visibility, especially at windshields and/or rear windows of a motor vehicle or of a construction equipment with movable parts, such as windshield wipers, should be pointed out in particular. For example, the partial cover for an area needed for visibility or a door may be sewn, bonded or welded by means of repeatedly openable and closable closures to cut and projecting edge parts of the trimmed area of the protective cover. The partial cover for a windshield may be connected to the protective cover, e.g., by means of a zipper with the edges of the trimmed areas along the edges of the windshield. If movement of the vehicle becomes necessary during transportation, a bar, which is connected to the slide of the zipper and is detachably fastened to the a pillar of the driver's side with the partial cover closed, guarantees easy opening of the partial cover over the entire area needed for visibility from the driver's side. The partial cover thus opened is rolled up toward the roof and is fastened with a holding strap arranged on the rear side of the partial cover, the bar being stored in the roll. The partial cover can then be rolled down again and the surface needed for visibility can again be closed. The partial cover for a door can also be opened and closed in the same manner, but no bar is needed at the zipper here. The partial cover for surfaces needed for visibility, which consist of a material that is transparent to light with areas made of a transparent film for the identification of the vehicle, or of a transparent film, can be optionally arranged between the surface needed for visibility and the movable parts such as windshield wipers or over the windshield wipers. If the partial cover is arranged over the windshield wipers, these can keep free the surface needed for visibility by means of spacers arranged under the partial cover with the partial cover closed, the height of the spacers guaranteeing the necessary free space for the ability of the windshield wipers to operate. If the partial cover is covered by dirt, rain or snow, it can be opened by means of a partial closure, which is arranged especially in the area of the driver or over the entire surface needed for visibility and can be repeatedly opened and closed, e.g., a zipper or hook and loop fastener, as a result of which the surface needed for visibility can be released and kept free by the windshield wipers. If the transparent partial cover is arranged between the surface needed for visibility and the windshield wipers, the windshield wipers can keep free the closed partial cover without the partial cover having to be opened. In a second variant, the partial cover for surfaces needed for visibility may optionally also be permanently bonded to a frame. By means of this frame, which is open towards the hood opening and is bonded on the surface needed for visibility along the longitudinal edges and the top edge by means of a repeatedly detachable bonded connection, the edges of the trimmed areas of the protective cover can be bonded along the area needed for visibility and those of a partial cover for surfaces needed for visibility can be bonded with a permanent adhesive, on the one hand, and with a repeatedly detachable adhesive tape on the surface needed for visibility, on the other hand, and the height of the frame guarantees the necessary freedom of movement of the windshield wipers under the closed partial cover. The frame can be detached with the partial cover and can be folded over toward the roof. Another possibility of protecting the surfaces needed for visibility is highly advantageous because separate frame parts provided with a profiled groove are bonded with a repeatedly detachable adhesive tape to the edges of the protective cover needed for visibility and the edges of the trimmed areas of the protective cover and/or those of the partial cover are bonded into the profiled groove of the separate frame parts along the edges of the surface needed for visibility either permanently or can be repeatedly pushed, snapped or clamped into the profiled groove by means of holding profiles. In both variants of the protection of surfaces needed for visibility by means of frames or separate frame parts, the windshield wipers have freedom of movement on the surface needed for visibility or even on the partial cover due to the open side of the frame at the hood opening. Finally, the windshield of a vehicle can also be kept free by firmly bonding the edges of the trimmed areas of the protective cover at the edges of the otherwise uncovered surface needed for visibility with a two-sided adhesive tape and again detaching them repeatedly and in a residue-free manner. The described solution variants of the protection of surfaces needed for visibility according to the present invention permit the flexible adaptation of the protection to the particular desires of the customer and to the existing conditions for transport. The protective films bonded to the surfaces needed for visibility before and their removal after the transportation of the object being protected are no longer necessary and the surfaces needed for visibility can nevertheless be protected from environmental chemical effects and the like. The protection of surfaces needed for visibility according to the present invention can, of course, also be adapted at any time to the requirements of road travel requirements.

The clamping profiles arranged partially at the edges of the trimmed areas of the protective cover in the area of door frames and the overlapping entry bracket detachably anchored in the inner floor area are also advantageous. With the partial cover at the driver's side door opened and the vehicle moving during transport, the clamping profiles protect the edges of the protective cover at the door rabbet, e.g., at the B pillar of a motor vehicle, against the entry of relative wind under the protective cover. The entry bracket also guarantees that the prior-art protective films can be eliminated at the entry and they make it difficult for air to enter the floor area. Depending on the model of the vehicle, the door rabbets may also be held with elastic tightening means such as rubber bands.

A fastening flap arranged in the area of the hood edge of the protective cover, which is adapted to the particular contours of the hood and of the hood opening and to the position of the spray nozzles and of the water tank and is mounted, extending over the hood edge, in an overlapping cut edge area of the protective cover, represents an advantageous addition to the protection of surfaces needed for visibility according to the present invention. The protective cover is fastened in the area of the hood opening by means of the inserted fastening flap by pushing in, snapping in or clamping in under the hood edge and it reliably closes the hood to prevent dirt, dust and relative wind from penetrating. If the vehicle must be moved during the transportation and it is raining, the fastening flap makes it possible to expose the spray nozzles of the washing unit and their use by unlocking the fastening flap and folding it over to the outside with the edge of the protective cover. After the use of the washing unit, the edge of the protective cover can again be closed by snapping in the fastening flap without the hood having to be opened.

The moldings which are arranged at the cut edges of the protective cover in the area of the wheelhouses, and the cutting rails and hooks arranged permanently but elastically in the area of the underbody are particularly advantageous. The trimmed areas of the protective cover in the area of the underbody are provided with elastic tensioning means such as rubber bands. In addition, these moldings according to the present invention, which are mounted in pockets in the area of the wheelhouses, are hung into and held in the wheel housings. The other trimmed areas of the protective cover in the area of the underbody can be additionally protected in a stable manner by the cutting rails or hooks bonded or sewn to the protective cover, which are hung or clamped into the lower edges of the body, to prevent relative wind, dirt and water from entering under the protective cover. The special advantage of these cutting rails and hooks is that they can be permanently but elastically sewn, bonded or welded to the edge of the protective cover in any area and they make it possible to eliminate the need for additional fastening systems, some of which are heat-resistant, in the area of the underbody. In addition, the material and the shape of the cutting rails and hooks are such that damage to the surface coating on the vehicle is prevented from occurring.

Furthermore, the clamping profiles which are adapted to the intermediate spaces between projecting parts and the surface of the object to be protected and its contours on both sides, should be pointed out. Due to the clamping profiles being pushed or snapped in, e.g., in the roof area, these are at the same time wrapped to a large part by the cover material and firmly hold the protective cover flatly in the clamped area in question on the surface of the object to be protected, so that the protective cover cannot inflate or flutter in this area, either.

The bar code flap, which can be arranged in any area, and the areas made of transparent film, which are arranged as needed, permit the easy identification of the vehicle during transportation, and the filler inlet compartment lid makes it possible to thank fill up the vehicle.

Another great advantage is achieved by the permeability to air of the material of the protective cover, so that the protective cover cannot inflate during the transportation and at the high wind speeds generated in the process, because the permeability to air minimizes the generation of vacuum. In addition, the problem of sealing seams can be eliminated by the parts of the protective film being weldable, as a result of which the seam areas also become impermeable to water and, e.g., rainwater is prevented from entering between the protective cover and the vehicle. Since the protective cover lies loosely on the vehicle, the formation of spots on the paint coat due to air bubbles, which may be formed under films placed by shrinking or application with a doctor blade, is also avoided. The nonwoven material is, furthermore, transparent to light, as a result of which the vehicle with the protective cover arranged thereon is suitable for being driven in every respect. The light signals are visible and no cut area is necessary in the area of the grille of the vehicle for the sufficient ventilation of the engine. In addition, the protective cover can be washed and thus reused without undergoing shrinkage due to the material used.

The protective cover, which can be optimally adapted to each vehicle model, can be pulled easily over the vehicle and anchored under the vehicle body by the rubber bands, cutting rails and hooks arranged at the lower edges of the protective cover. The edges of the protective cover in the areas of the wheelhouses are effectively held and protected by hanging the moldings into the wheel housings and in the area of the door rabbets by the clamping profiles or by elastic tightening means. The partial covers on the surfaces needed for visibility and doors are protected by closures that can be opened or closed repeatedly, such as hook and loop fasteners, zippers or frames, such that the windshield wipers can be used trouble-free with the partial cover opened or closed and the edge area of the hood edge is protected by the fastening flap snapped under the hood edge in a detachable but stable manner, and the clamping profiles at the projecting parts in the roof area hold the protective cover firmly on the surface of the vehicle.

Longer service life of the protective cover in the area of surfaces needed for visibility and its repeated use is thus guaranteed. In addition, relative wind, dust, water, etc., is effectively prevented from entering under the protective cover.

Finally, access is possible to the rear and for moving the vehicle during transportation as needed due to the fastening flap arranged at the edge of the hood, the various detachable protections for surfaces needed for visibility, the partial covers that can be opened at doors and in other areas. The protective cover is not destroyed and it can be used repeatedly regardless of the site. In addition, skilled personnel are not needed for the site-independent placement and removal from the vehicle, which in turn leads to great cost savings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
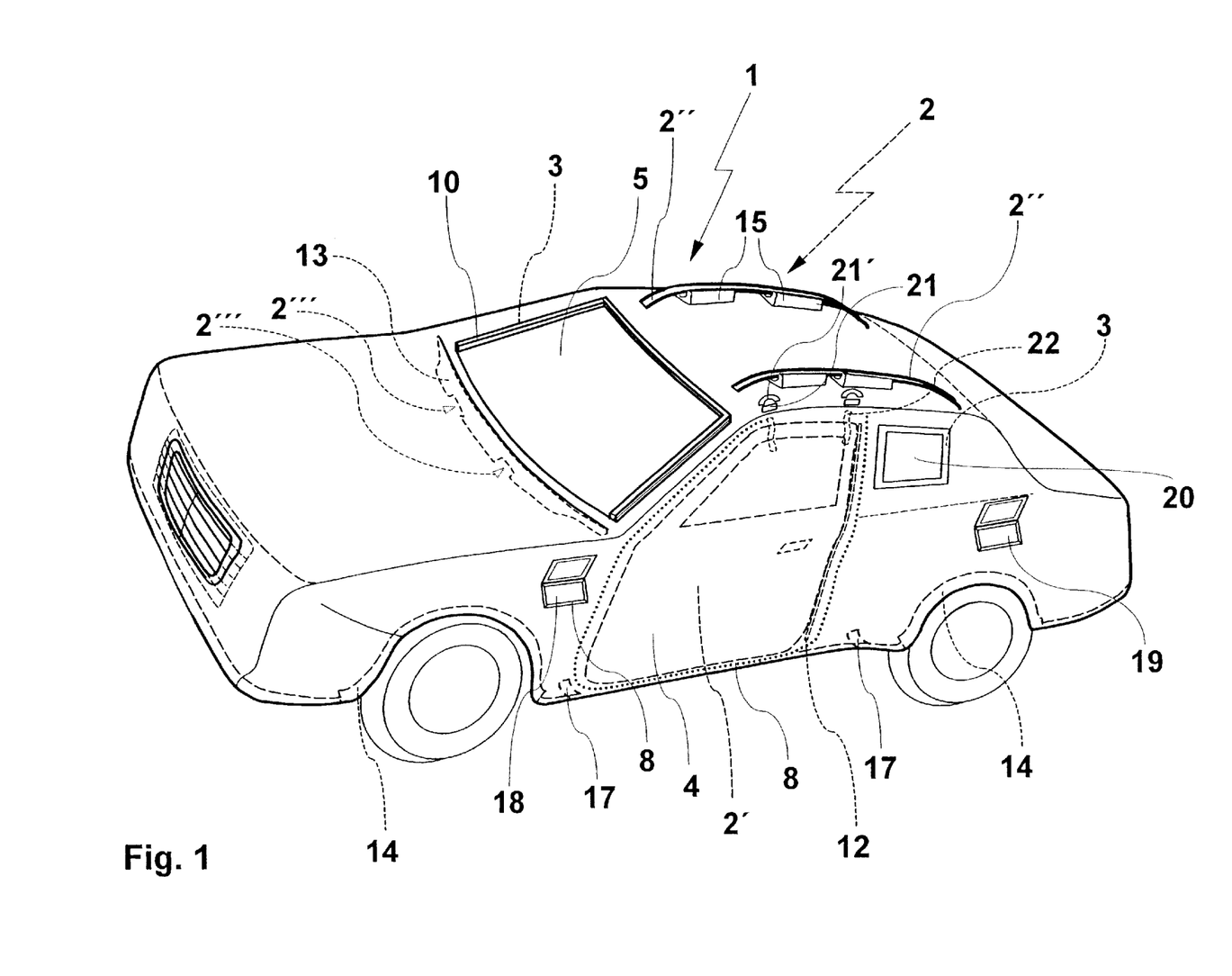
FIG. 1 is a perspective view of a vehicle with protective cover, partial covers, protection for surfaces needed for visibility, hood edge protection, etc.
Figure 1A:
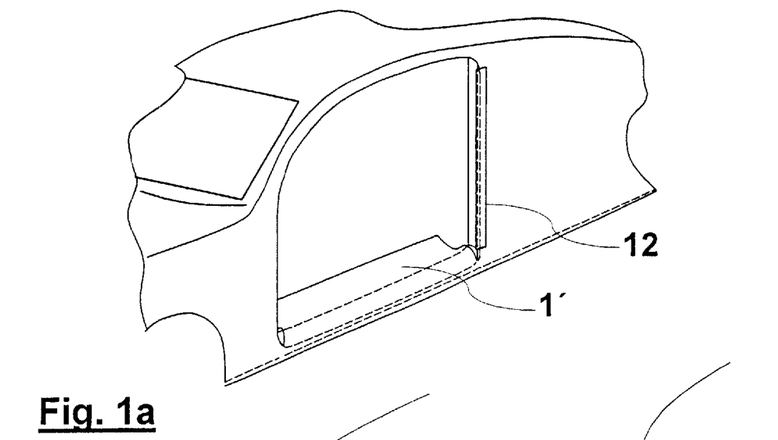
FIG. 1a shows a detail of a door frame, without door.

A polypropylene nonwoven according to DIN 60001, called PP nonwoven for short is a nonwoven construction according to DIN 61210 with a filament nonwoven with web bonding according to DIN 611210, particularly thermal bonding. PP nonwoven is employed in the protective cover 1 according to the present invention. The nonwoven material has, e.g., a resistance to tearing of at least 100 N/5 cm in the longitudinal direction and >25 N in the transverse direction. The weight of the material is 70 g/m²±10 g/m² in this case. It is, of course, also possible to use other material thicknesses. The one-part protective cover 1 according to FIG. 1 is optimally adapted to the contours of an object 2 to be protected, e.g., a passenger car. Corresponding to the customer's wishes, trimmed areas 3 are arranged at the windshield, the driver's side door and at the window behind the driver's side door. The partial cover 4 for the door is cut in on the roof area of the protective cover 1 in the area of the top edge of the door frame and is fixed, held and closed by means of a repeatedly detachable closure 8, e.g., a zipper, at the edges of the trimmed areas 3, on the one hand, and at the edges of the partial covers 4 for doors, on the other hand, and the water-repellent zipper with its chain is arranged on the inside and the connections are preferably sewn or bonded. The edge areas of the protective cover 1 in the area of the door frame are additionally fastened with a clamping profile 12 at the B pillar, as a result of which the protective cover 1 is protected from the entry of relative wind with the partial cover 4 for doors at the door rabbet opened. To move the vehicle, the zipper is opened at the partial cover 4, the partial cover 4 is rolled up in the direction of the roof and is fastened with the loop 21' in the edge area of the roof at the bracket 21 by means of a holding strap 22 arranged on the rear side of the partial cover 4. The protective cover 1 has, furthermore, an entry bracket 1' at the door entry, which entry bracket is cut overlappingly, covers the entry up to the interior of the rear and is detachably fastened under the floor mat. This entry bracket 1' eliminates the need for the protective film otherwise arranged on the door entry.

Figure 8:
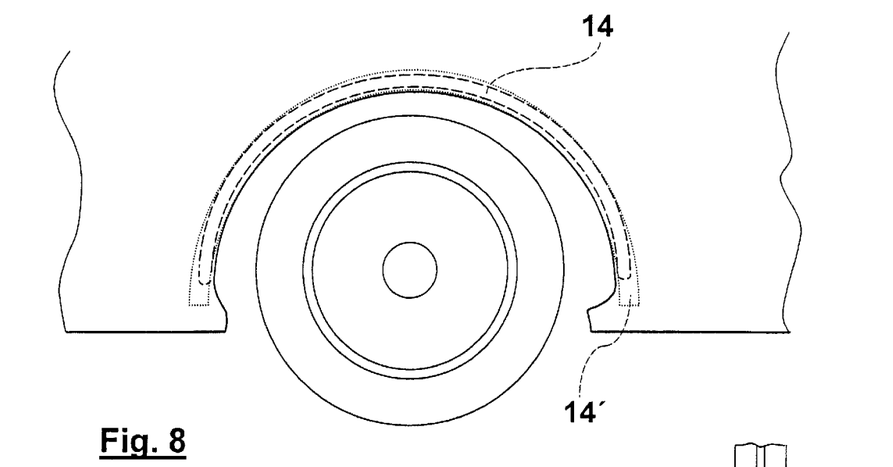
FIG. 8 is a front view of a wheelhouse with molding snapped into the wheel housing.
Figures 9, 10, 11:
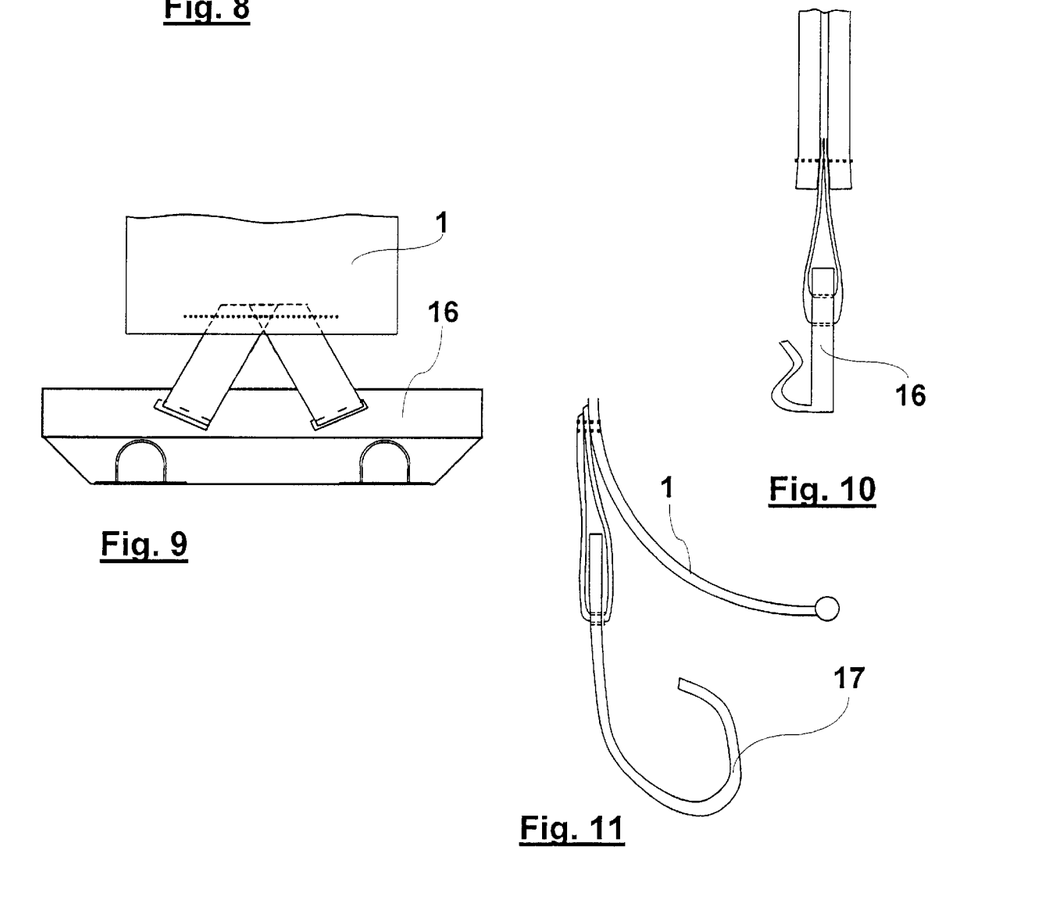
FIG. 9 is a front view of a cutting rail fastened elastically at the edge of the protective cover.
FIG. 10 is a side view of FIG. 9.
FIG. 11 is a side view of a hook arranged in the lower area of a protective cover.

In the area of the wheelhouses, the edges of the areas 3 are advantageously fastened by moldings 14 mounted in pockets 14' according to FIG. 8. The trimmed areas 3 of the protective cover 1 in the area of the underbody are additionally provided with cutting rails 16 or with hooks 17 besides the rubber bands preferably provided, and these hooks are preferably sewn to the lower area of the protective cover 1 and are hung in at the lower edge of the vehicle. A fastening flap 13 is preferably sewn or welded into the overlappingly cut edge of the protective cover 1 along the edge of the hood.

Figure 6:
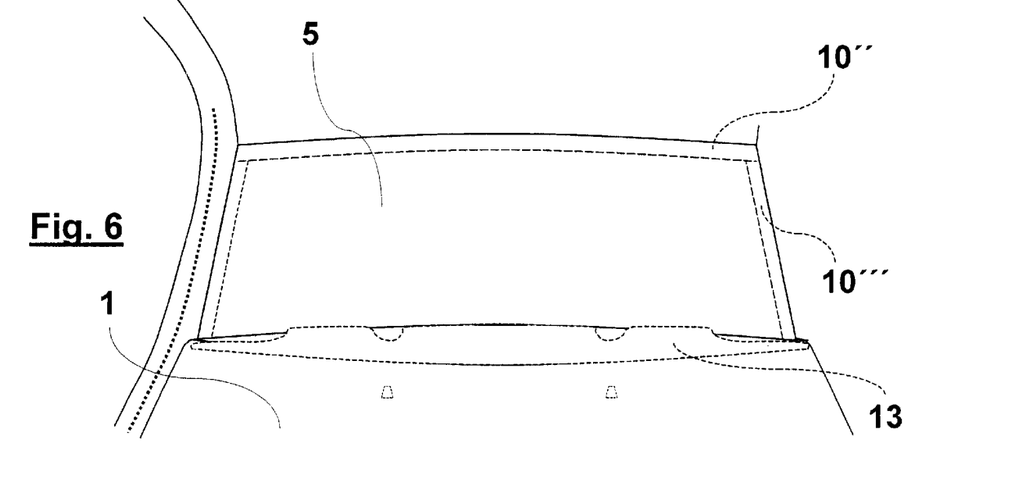
FIG. 6 is a top view of a fastening flap at a hood edge in the folded-out state.

FIG. 6 shows the overlappingly cut edge of the protective cover 1 at the edge of the hood in the unfastened state. The fastening flap 13 is adapted to the particular contours of the hood as well as to the points at which the spray nozzles of the vehicle are arranged. The edge of the protective cover 1 with the fastening flap 13 inserted is clamped for fastening under the hood over the hood opening according to FIG. 1, as a result of which the protective cover 1 is firmly anchored in this area with one movement. If the windshield wiper unit needs to be operated, the fastening flap 13 is again folded out onto the protective cover 1 in the area of the hood, tilted over in the direction of travel, and the spray nozzles are exposed without the hood having to be opened. After use, the protective cover 1 can be immediately closed again in this area. The protective cover 1 in the exemplary embodiment is preferably provided with a frame 10 in the area of the windshield. The frame 10, consisting of a foamed material, is permanently bonded, on the one hand, to the edges of the trimmed areas 3 of the protective cover 1 at the edges of the windshield and to the edges of the partial cover 5 for surfaces needed for visibility, which preferably consists of a material that is transparent to light here, and, on the other hand, it is bonded with an adhesive film to the windshield in such a manner that it can be detached repeatedly and without residue. In this variant of the protection of surfaces needed for visibility, the windshield wipers on the windshield under the closed partial cover 5, which are not shown in detail in FIG. 1, or with the frame 10 folded up in the direction of the roof with the partial cover 5 opened, can be moved without trouble. The vehicle according to the exemplary embodiment is provided on the roof with projecting parts 2", in this case with a roof rail.

Figure 7:
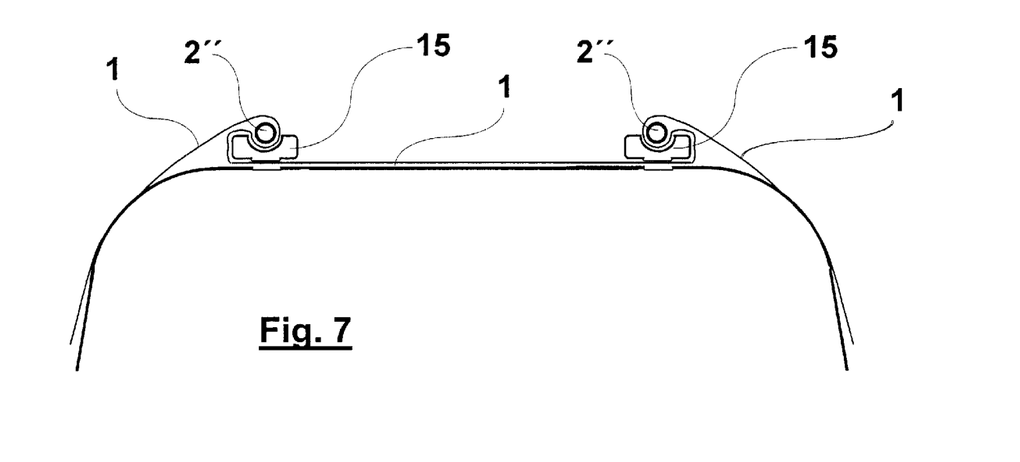
FIG. 7 is a partial view of a roof area with protective cover and clamping profiles.

When the protective cover 1 is pulled over the vehicle and is anchored in the area of the underbody, at the wheel housings, the hood, the doors, etc., there is a relatively large intermediate space between the protective cover material pulled over the roof rail and the roof surface, and this intermediate space leads to fluttering and inflation of the protective cover 1 in this area during transportation. This drawback is effectively counteracted with the clamping profiles 15 according to the present invention by a plurality of clamping profiles 15 having different lengths being clamped according to FIG. 7 on the protective cover material between the surface of the roof and the roof rail. The surfaces of the clamping profiles 15, which are adapted to the particular roof contours, on the one hand, and to the particular contour of the roof rail, on the other hand, guarantee that the clamping profiles 15 snap into these contours, and the material of the protective cover 1 will extensively envelope the clamping profiles 15 and will be tensioned at the same time over the roof surface of the vehicle. The protective cover 1 is, moreover, provided with a bar code flap 18 for the identification of the vehicle by means of scanners, and with a filler inlet compartment lid 19, both of which can be easily opened and closed again with a hook and loop fastener. The area consisting of transparent film 20, which is likewise provided, makes it possible to see the interior space of the vehicle.

Figure 2:
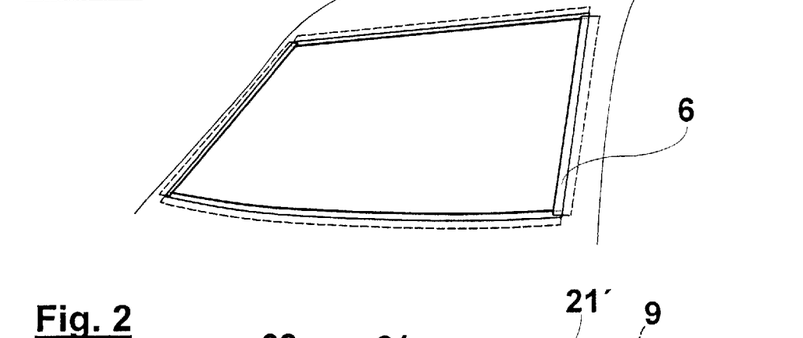
FIG. 2 is a front view of the opening of a windshield with trimmed areas, which are bonded to the windshield with two-sided adhesive tape.

FIG. 2 shows another variant of the protection for surfaces needed for visibility at the windshield of a vehicle, in which the windshield remains essentially uncovered. The edges of the trimmed areas 3 at the protective cover 1 along the edges of the windshield are bonded to the windshield with a two-sided adhesive tape 6 in this case and these prevent relative wind, dirt and moisture from entering under the protective cover 1 in this area. In addition, the two-sided adhesive tape 6 can be detached from the windshield repeatedly and without residues.

Figure 3:
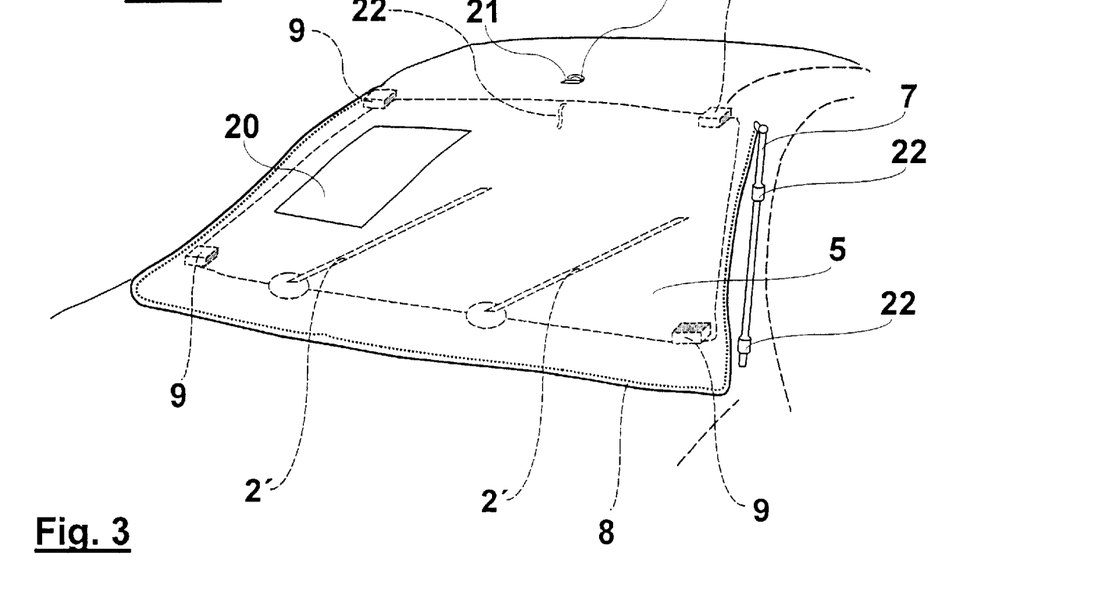
FIG. 3 is a partial view of an opened protection for surfaces needed for visibility, which is arranged on a windshield, with spacers, zipper with bar and with an area made of transparent film.
Figure 4:
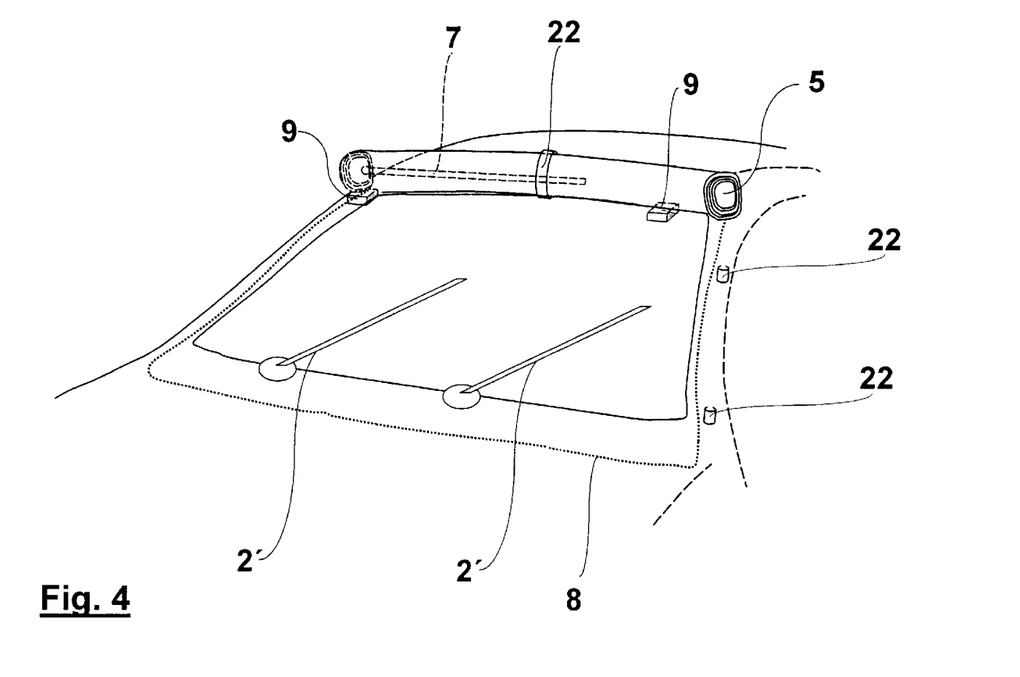
FIG. 4 is a protection for surfaces needed for visibility according to FIG. 2 in the opened state.

FIG. 3 shows another, frequently preferred variant of the protection for surfaces needed for visibility according to the present invention. The partial cover 5 preferably consists of a material that is transparent to light with a surface 20 needed for visibility made of a transparent film. This is preferably sewn to the edges of the trimmed area 3 of the protective cover 1 in the area of the windshield by means of a closures 8 that can be repeatedly opened, in this case a zipper with a bar 7 locked at the A pillar on the driver's side. Spacers 9 have a height guarantees the trouble-free function of movable parts 2', here the windshield wipers, even with the partial cover 5 closed. The spacers 9 are detachably arranged on the inside of the partial cover 5. Should the partial cover 5 be contaminated by dirt or covered with snow, it can be easily opened from the driver's side with the bar 7 of the closure 8, rolled up in the direction of the roof according to FIG. 4, and held at the edge of the roof at the bracket 21 with the loop 21' by means of a holding strap 22 arranged on the rear side of the partial cover 5. The bar 7 is also rolled into the partial cover 5 for the period of opening and held at the edge of the roof. This form of protection of surfaces needed for visibility may also be achieved by the partial cover 5 being arranged between the windshield wipers and the surface needed for visibility. The windshield wipers are guided in this variant by bags of material arranged in the protective cover 1 and the partial cover 5 can be cleaned by the windshield wipers.

Figure 5:
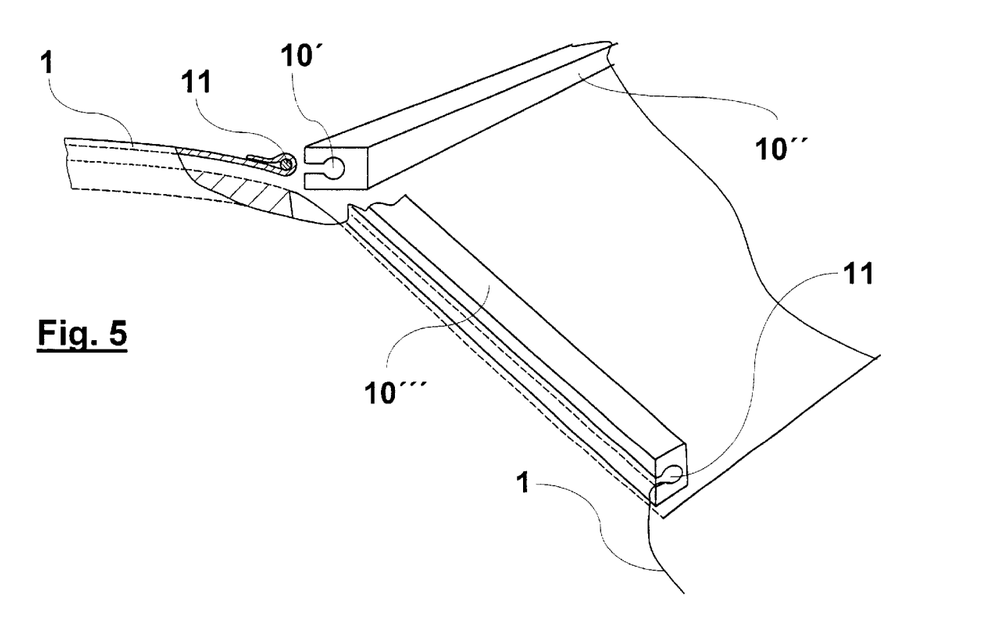
FIG. 5 is a side view of a protection for surfaces needed for visibility with profiled groove with holding profile in the edge area of the protective cover.

FIG. 5 shows another possible variant of the protection for surfaces needed for visibility. Holding profiles 11 are sewn or welded into the overlappingly cut edges of the trimmed area 3 of the protective cover 1 in this case. The edges thus reinforced are pushed or locked into the profiled grooves 10' of separate frame parts 10" and 10''' and bonded to the windshield with a repeatedly detachable two-sided adhesive tape 6. The surface needed for visibility can remain free in this variant or additionally closed with a partial cover 5, and the edges of the partial cover 5 can be clamped or bonded into the profiled grooves 10' of the separate frame parts 10" and 10''' in the same manner as the edges of the trimmed areas of the protective cover 1. The windshield wipers, which are not shown in detail in FIG. 5, can be used without trouble with the partial cover 5 opened or closed in this variant as well. The different variants of the protection of surfaces needed for visibility can, of course, also be used at rear windows with and without windshield wipers.

The great number of variants of the repeatedly closable and detachable protection for surfaces needed for visibility, of the closures at the edges of trimmed areas as well as of the various profiles at the free cut edges or between projecting parts and the object to be protected permit an optimal adaptation of the protective cover to a great variety of different models of vehicles and individual wishes of customers.

While specific embodiments of the invention have been shown and described in detail to illustrate the application of the principles of the invention, it will be understood that the invention may be embodied otherwise without departing from such principles.

What is claimed is:

1. A protective cover (1) for motor vehicles or machines, which is adapted to the overall outer shape or to the shape of individual parts of an object (2) to be protected, is formed from one piece or a plurality of parts connected to one another and is provided with trimmed areas (3) at surfaces needed for visibility, doors and access regions, and which is combined with partial covers (4) for doors and with partial covers (5) for surfaces needed for visibility, which said partial covers (4, 5) consist of a transparent film and can be repeatedly opened and closed, whose edges at an underbody of, and at wheel housings of the object are fixed and held elastically directly at the object (2) to be protected or at the edges of the partial covers (4) for doors or of said partial covers (5) for surfaces needed for visibility, are connected to one another in a repeatedly openable and closable and detachable manner, and which consist of a material that is permeable to air, vapor and light from the inside and is resistant to UV rays and alkalies and impermeable to water and dust from the outside and can be printed on, which material is partially replaced with a transparent material, wherein the edges of the trimmed areas (3) of the protective cover (1) are either firmly bonded to the otherwise free surface needed for visibility or to the edges of the partial cover (5) for surfaces needed for visibility along the edges of the surfaces needed for visibility on the object (2) with a two-sided adhesive tape (6) or they are connected to one another with the edges of the partial cover (5) for surfaces needed for visibility by means of a closure (8) that is coupled with a bar (7) and can be repeatedly opened and closed and of spacers (9) arranged on the rear side of the partial cover (5) for surfaces needed for visibility, or they are permanently bonded to a profiled groove (10') and a holding profile (11) with an adhesive by means of a frame (10) or separate frame parts (10", 10'''), or they are detachably held in the profiled groove (10') with holding profiles (11), wherein movable parts (2') of the object (2) which are arranged movably over the surface needed for visibility are able to function without being destroyed on the surface needed for visibility or under and on the closed partial cover (5) for surfaces needed for visibility, and the freedom of movement of the movable parts (2') between the closed partial cover (5) for surfaces needed for visibility and the surface needed for visibility is to be determined by the height of the spacers (9) or of the frame (10) or of the separate frame parts (10", 10'''), the edges of the trimmed areas (3) of the protective cover (1) are clamped or braced along door frames of the object (2) partially with a clamping profile (12) or an elastic tightening means, and they are detachably held at the object (2) with an overlapping entry bracket (1'), a border, in which a fastening flap (13) is inserted, is made in one piece in an overlappingly cut edge of the trimmed area (3) along a hood edge of the object (2), and a pocket (14') with an inserted molding (14) is arranged on the inner side of the protective cover (1) along wheelhouses of the object, the protective cover (1) is held in firm contact with the object (2) in the area of a projecting part (2") by clamping profiles (15) enveloped into the material of the protective cover (1) or by fasteners made of hook and loop fastener, the edges of the trimmed areas (3) of the protective cover (1) are held in the area of an underbody of the object (2), besides by an elastic tightening means, with cutting rails (16) or hooks (17), which are arranged elastically on the protective cover (1) in the direction of the underbody, the protective cover (1) has a bar code flap (18), which can be opened and closed, a filler inlet compartment lid (19) and, in the area of surfaces needed for visibility or of headlights, transparent film areas (20), and the bar (7) and the partial covers (4) for doors and the partial covers (5) for surfaces needed for visibility, which said partial covers (4, 5) are opened and rolled up toward the roof, are held repeatedly detachably on an inner side of the partial covers (4, 5) with at least one bracket (21) arranged in the area of the driver's side and of roof edges of the protective cover (1) with a loop (21') and with at least one holding strap (22) and a counterpiece on the inner side of the said partial covers (4, 5).

2. A protective cover in accordance with claim 1, wherein the frame (10) or the separate frame parts (10", 10''') consist of a foamed material and are connected to the edges of the trimmed areas (3) of the protective cover (1) by means of a permanent adhesive, on the one hand, and, on the other hand, to the surface needed for visibility by means of an adhesive film, wherein the surface needed for visibility remains free, or they are connected with a permanent adhesive to the partial cover (5) for surfaces needed for visibility or are provided with a profiled groove (10') on the outer front sides, wherein the edges of the trimmed areas (3) and the edges of the partial cover (5) for surfaces needed for visibility are either bonded into the profiled groove (10') with a permanent adhesive, or the edges of the trimmed areas (3), which are stabilized by the holding profiles (11), are pushed, snapped or clamped into and held detachably in the profiled groove (10'), wherein the holding profiles (11) have a cross section adapted to the profiled groove (10'), consist of a low-density polyethylene foam material or another plastic, and are inserted in overlappingly cut edges of the trimmed areas (3) at the surfaces of the protective cover (1) that are needed for visibility or of the partial cover (5) for surfaces needed for visibility.

3. A protective cover in accordance with claim 1, wherein the clamping profile (12) is an injection-molded part adapted to the object (2), an extruded or deep-drawn part made of plastic or of rubber coated with plastic or of a material reinforced with metal, which is connected to an overlappingly cut edge of the trimmed area (3) along the door frame in a nonpositive manner.

4. A protective cover in accordance with claim 1, wherein the fastening flap (13) is a part that is adapted to the contours of the hood opening and of the spray nozzles (2'''), consists of any solid plastic, cardboard or hard cardboard, is shaped by CNC milling, punching, bending, injection molding, deep-drawing, extrusion or calendaring, and can be fastened or loosened under the hood by pushing in, snapping in or clamping in, wherein the spray nozzles (2''') can be exposed and covered again without the protective cover (1) having to be removed.

5. A protective cover in accordance with claim 1, wherein the molding (14) is a part adapted to the wheelhouses, is shaped from any solid plastic, cardboard or hard cardboard by CNC milling, punching, bending, injection molding, deep-drawing, extrusion or calendaring and can be snapped into the wheel housing.

6. A protective cover in accordance with claim 1, wherein the clamping profiles (15) are adapted to the intermediate spaces and on both sides to the different contours of the projecting parts (2") and the surface of the object (2), taking into account the thickness of the material of the protective cover (1), and they consist of foamed or other plastic material.

7. A protective cover in accordance with claim 1, wherein the cutting rails (16) and the hooks (17) consist of a plastic or a plastic-coated material, they are fastened in a stable manner and elastically at the trimmed areas (3) of the area of the underbody or above the edge areas of the protective cover (1), on the one hand, and are snapped or hooked in in a stable manner at the edges of smooth or profiled sheet metal parts at the underbody of the object (2), on the other hand.

8. A protective cover in accordance with claim 1, wherein the partial covers (5) for surfaces needed for visibility consist of a material that is transparent to light with areas made of a clear-view film (20) or a transparent film.

9. A protective cover in accordance with claim 1, wherein the two-sided adhesive tape (6) is a commercially available adhesive tape, which can be arranged in a nonpositive manner at the edges of the trimmed areas (3) along areas of the protective cover (1) that are needed for visibility by sewing, welding or bonding and can be firmly bonded to the surfaces needed for visibility or can be repeatedly separated without residue.

10. A protective cover in accordance with claim 1, wherein the bar (7) is locked on the protective cover (1) with the partial cover (5) for surfaces needed for visibility closed on the driver's side and is held detachably and is held in the partial cover (5) with the partial cover (5) for surfaces needed for visibility opened and rolled up toward the roof edge.

11. A motor vehicle or machine protective cover adapted to the overall outer shape or to the shape of individual parts of an object to be protected, the cover comprising:

one or more pieces with trimmed areas at surfaces needed for visibility;

partial area covers provided for covering surfaces needed for visibility, said partial covers being formed of a material that is permeable to air, vapor and light from the inside and is resistant to UV rays and alkalies and impermeable to water and dust from the outside and can be printed on, the material being partially replaced with a transparent material;

trimmed area connections between said one or more pieces and said partial areas that can be repeatedly opened and closed and detached, trimmed area connections including one of a bond two-sided adhesive tape or a closure (8) that is coupled with a bar (7) and can be repeatedly opened and closed and with spacers (9) arranged on a rear side of the partial area cover (5) for surfaces needed for visibility, or a permanent bond to a profiled groove (10') and a holding profile (11) with an adhesive by means of a frame (10) or separate frame parts (10", 10'''), or detachably held in a profiled groove (10') with holding profiles (11), wherein said moveable parts (2') of the object (2) which are arranged movably over the surface needed for visibility are able to function without being destroyed on the surface needed for visibility or under and on the closed partial cover (5) for surfaces needed for visibility, and the freedom of movement of movable parts between the closed partial cover (5) for surfaces needed for visibility and the surface needed for visibility is to be determined by the height of spacers (9) or of the frame (10) or of the separate frame parts (10", 10'''), or the trimmed areas (3) of the protective cover (1) are clamped or braced along door frames of the object partially with a clamping profile (12) or an elastic tightening means, and they are detachably held at the object (2) with an overlapping entry bracket (1'), or a border, in which a fastening flap (13) is inserted, is made in one piece in an overlappingly cut edge of the trimmed area (3) along a hood edge of the object, and a pocket (14') with a inserted molding (14) is arranged on the inner side of the protective cover (1) along wheelhouses of the object;

clamping profiles for holding the protective cover in firm contact with the object in the area of a projecting part, the clamping profiles (15) enveloping into the material of the protective cover or being fastened by hook and loop fasteners;

elastic tightening means for holding edges of the trimmed areas (3) in the area of an underbody of the object with cutting rails (16) or hooks (17) arranged elastically on the protective cover in the direction of the underbody;

the protective cover that can be opened and closed including one of a bar code flap, a fluid tank inlet compartment lid flap and transparent film flaps for a further region needed for visibility or of headlights, the bar (7) and partial covers (4) for doors and the partial covers (5) for surfaces needed for visibility, which said partial covers (4, 5) are opened and rolled up toward the roof, are held repeatedly detachably on an inner side of the partial covers (4, 5) with at least one bracket (21) arranged in the area of the driver's side and of roof edges of the protective cover (1) with a loop (21') and with at least one holding strap (22) and a counterpiece on the inner side of the said partial covers (4, 5).

12. A motor vehicle or machine protective cover adapted to the overall outer shape or to the shape of individual parts of an object to be protected, the cover comprising:

one or more pieces with trimmed areas at surfaces needed for visibility;

partial area covers provided for covering surfaces needed for visibility, said partial covers being formed of a material that is permeable to air, vapor and light from the inside and is resistant to UV rays and alkalies and impermeable to water and dust from the outside and can be printed on, the material being partially replaced with a transparent material;

trimmed area connections between said one or more pieces and said partial areas that can be repeatedly opened and closed and detached, trimmed area connections including one of a bond two-sided adhesive tape or a closure (8) that is coupled with a bar (7) and can be repeatedly opened and closed, and with spacers (9) arranged on a rear side of the partial area cover (5) for surfaces needed for visibility, or a permanent bond to a profiled groove (10') and a holding profile (11) with an adhesive by means of a frame (10) or separate frame parts (10", 10'''), or detachably held in a profiled groove (10') with holding profiles (11), wherein movable parts of the object which are arranged movably over the surface needed for visibility are able to function without being destroyed on the surface needed for visibility or under and on the closed partial cover (5) for surfaces needed for visibility, and the freedom of movement of the movable parts between the closed partial cover (5) for surfaces needed for visibility and the surface needed for visibility is to be determined by the height of spacers (9) or of the frame (10) or of the separate frame parts (10", 10'''), or the trimmed areas (3) of the protective cover (1) are clamped or braced along the door frames of the object partially with a clamping profile (12) or an elastic tightening means, and they are detachably held at the said object (2) with an overlapping entry bracket (1'), or a border, in which a fastening flap (13) is inserted, is made in one piece in an overlappingly cut edge of the trimmed area (3) along a hood edge of the object, and a pocket (14') with an inserted molding (14) is arranged on the inner side of the protective cover (1) along wheelhouses of the object; and a bracket (21) arranged in the area of the driver's side and of the roof edges of the protective cover (1) with a loop (21') and with at least one holding strap (22) as a counterpiece on the inner side of the said partial covers (5), the bar (7) and the partial covers (4) for doors and the partial covers (5) for surfaces needed for visibility, upon being opened and rolled up toward the roof, are held repeatedly detachably on the inner side of the partial covers (4, 5) via the bracket (21).

* * * * *